March 22, 1955   H. W. HENDERSON   2,704,675
RESILIENT AND PRESSURE RETAINING SEAT FOR TUBE ENDS
Filed July 15, 1952
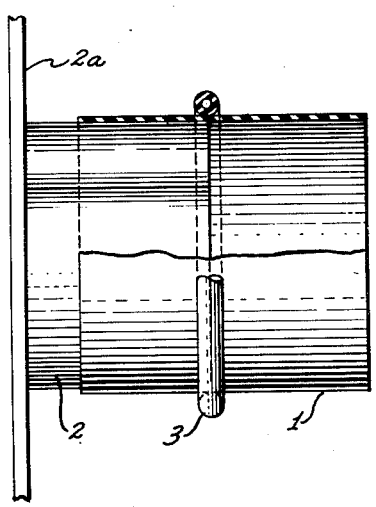
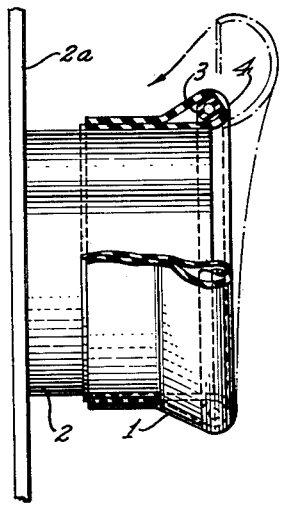
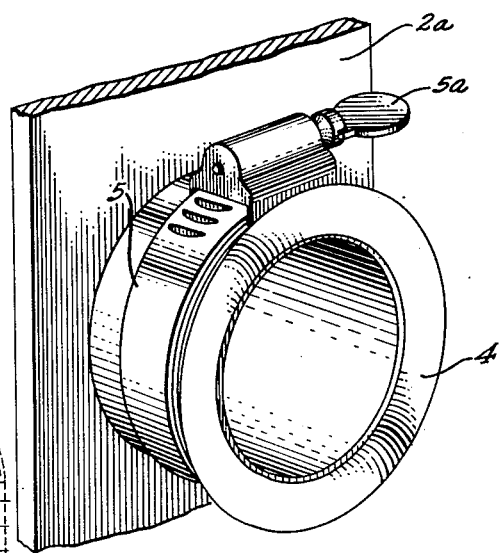
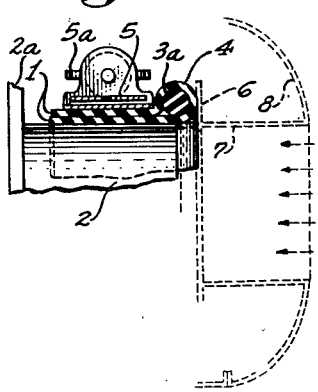
INVENTOR:
HENRY W. HENDERSON
By Hubert E. Metcalf
HIS PATENT ATTORNEY

United States Patent Office 2,704,675
Patented Mar. 22, 1955

2,704,675

RESILIENT AND PRESSURE RETAINING SEAT FOR TUBE ENDS

Henry W. Henderson, Santa Monica, Calif., assignor to Northrop Aircraft, Inc., Hawthorne, Calif., a corporation of California Application July 15, 1952, Serial No. 298,991

1 Claim. (Cl. 285—25)

This invention relates to a resilient and pressure retaining seat around the edge of a tubular member such as a section of air duct adapted to be engaged by the end of another tubular member of substantially equal diameter, or to engage around an opening in a plate, the abutting tube end or plate being pressed against the seat to provide a pressure retaining seal for fluid flowing through the tubular member.

The invention may be utilized in various structures and will be hereinafter specifically described with relation to aircraft by way of illustration only.

In aircraft it is necessary in various locations to provide a joint between conduits conducting fluid, such as air, at relatively low pressures. Such joints may be located within cowlings or other cover structures and therefore should fit correctly without need for visual inspection and manual adjustment. An example of such construction is a joint in a conduit within an engine nacelle, part of the conduit projecting from the casing of an electric generator mounted in the nacelle, and part of the conduit being mounted in the nose piece of the engine nacelle. It is necessary that the conduit parts be butted in alignment on fitting the nose piece onto the nacelle to provide a joint which will be leak-proof under the pressure of cooling air taken into an opening in the nose piece and flowing through the conduit to cool the generator.

The common practice in providing for a pressure retaining seat around a joint of the kind referred to is to use a length of special extruded soft rubber strip having a bulb section along a side. The strip is wrapped around the duct so that the bulb side follows the edge of the duct end and the strip is held in place by a clamp. The flat extrusion of rubber is generally not satisfactory since it must be cut exactly long enough to fit the circumference of the duct, which is liable to result in a gap due to error in fabrication even when the two ends are cut on the oblique; and although the total length may be exactly right the length of extrusion tends to wrinkle, permitting leakage.

It is another object of the invention to provide a resilient pressure retaining seat for a simple and economical seal of the kind described, the parts of which are easy to manufacture and simple to install.

With these and other objects in view according to my invention use is made of a length of rubber tube of a diameter to fit snugly on the end of the tubular member, which tube is so doubled back on itself over a length of small diameter rubber tubing for example, of the correct length wound around the end of the tubular member over the first thickness of rubber tube, to create a bulb section at the end of the tubular member. A clamp or other fastening means placed just behind the bulb section is used to hold the assembly in place to form a resilient seat for an abutting member.

The invention will be more fully understood by reference to the accompanying drawings, in which:

Figure 1 is a partially sectional view showing a resilient seat incorporating the features of my invention, positioned on an air duct, and in an initial stage of formation.

Figure 2 is a view similar to Figure 1 but showing the resilient seat at a later stage of formation than in Figure 1.

Figure 3 is a perspective view of the finished seat showing a clamp holding the assembly in position.

Figure 4 is a fragmentary, sectional view of the bulb section and the clamp in place.

Referring to the drawings, Figure 1 shows a short length of resilient rubber tube 1 which is of a diameter to fit snugly over the end of air duct 2 and is worked approximately for half its length over the end of the end portion of the air duct, which projects from the wall 2a of a casing. In the next step a length of rubber tubing 3, substantially equal to the circumference of the air duct 2, is positioned around the end of duct 2 over the rubber tube. The free end of resilient rubber tube 1 is then doubled back over the rubber tubing 3 and onto itself as shown in Figure 2, thus forming a bulb section 4 which presents a forwardly facing resilient seat for a junction with a co-axial tubular member which is engaged against the seat in a plane normal to the axis of the tubular member. No wrinkling will result if the diameter of the length of resilient rubber tube 1 is such that it will fit snugly over the end of air duct 2.

The complete assembly of the finished seat of a preferred embodiment is shown in Figure 3. The length of the resilient rubber tube 1 is sufficient so that when folded back on itself, an adjustable clamp 5, tightened by thumb screw 5a, can be fastened over both thicknesses of the rubber tube 7 and close against the bulb section 4, thus holding the formed seat firmly in position around the end of the air duct 2, as clearly illustrated in Figure 4, which shows the seat 4 engaged by a collar 6 on the inner end of an intake air duct 7 mounted on the nose section 8 of the engine nacelle (not shown). It is obviously feasible to rivet the seat in place on air duct 2 for a permanent installation, instead of using a clamp. If the grip of the rubber tube 1 is firm enough on air duct 2, the clamp 5 can be omitted and the overlapping resilient rubber tube layers can be cemented, stitched, or otherwise secured together behind the bulb section 4.

It should be noted that the resilient rubber tube 1 is preferably fabricated from materials which form a chemically acid-resistant product and is able to fit snugly around oval or even angular ducts. Furthermore, it is not necessary to restrict the bulb forming element to a length of rubber tubing as it has been found that a solid rubber cord 3a as shown in Figure 4, or flexible wire, can replace tubing 3 if a small cushion airspace is left between the bulb forming element and the rubber tube 1. In the latter case, the bulb forming element maintains the shape of the bulb section. Of course, the air cushion is not absolutely necessary since adequate resilience is afforded by the resilient tube and the bulb forming element. If a highly resilient bulb section is desired, it is possible to omit entirely the bulb forming element, the reverse bend of the rubber tube which projects beyond the end of the duct being sufficient to provide a resilient forwardly facing seat which is adequate for some uses.

It is pointed out that a "bulb" section has been referred to as being formed at the reverse bend of the resilient tube, but it is pointed out that the area at said reverse bend may provide a seat of sufficient resiliency without the formation of an actual bulb.

From the above description it will be apparent that I have provided a resilient seat possessing the particular features of advantage before enumerated as desirable, but the described embodiments of the invention are obviously susceptible of modification as to its form, proportion, detail construction and arrangement of parts without departing from the characteristic novel features thereof or sacrificing any of the advantages provided by the invention.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claim.

What is claimed is:

A seamless joint construction comprising: a rigid cylindrical tubular member; a length of resilient seamless tube of substantially uniform wall thickness positioned on an end of said member and of a diameter to firmly grip said tubular member, the length of said tube being sufficient to project beyond said end; a length of resilient rubber-like tubing of a length substantially equal to and not greater than the periphery of said tubular member positioned around and upon the surface of said resilient tube at said end of the tubular member, the length of said resilient tube extending beyond said tubing, being doubled back on itself over said length of tubing to enclose it and lie upon the outer surface of said resilient tube, the construction providing an axially facing completely resilient seamless seat, bulb-shaped in radial section and projecting beyond the end of said tubular member; means securing said doubled resilient tube together and to the rigid tubular member; and a second rigid member having a circular opening therein at least as small as and registering with the open end of said tubular member and having a surrounding surface disposed substantially normal to the axis of said tubular member abutting against said seat.

References Cited in the file of this patent

UNITED STATES PATENTS

| | | |
|---|---|---|
| 668,501 | Davis | Feb. 19, 1901 |
| 1,303,402 | Schirra | May 13, 1919 |
| 2,175,713 | Winder | Oct. 10, 1939 |
| 2,245,037 | Hersey | June 10, 1941 |
| 2,313,999 | Kreiselman | Mar. 16, 1943 |
| 2,327,541 | Matheny | Aug. 24, 1943 |
| 2,410,786 | Mallory | Nov. 5, 1946 |
| 2,550,099 | Vance | Apr. 24, 1951 |